(12) United States Patent
Seo et al.

(10) Patent No.: US 12,395,761 B2
(45) Date of Patent: Aug. 19, 2025

(54) PIXEL ARRAY ACCUMULATING PHOTOCHARGES IN EACH UNIT FRAME, AND IMAGE SENSOR INCLUDING THE PIXEL ARRAY

(71) Applicant: Samsung Electronics Co., Ltd., Suwon-si (KR)

(72) Inventors: Minwoong Seo, Hwaseong-si (KR); Hyunyong Jung, Seoul (KR); Daehee Bae, Hwaseong-si (KR); Myunglae Chu, Hwaseong-si (KR)

(73) Assignee: Samsung Electronics Co., Ltd, Gyeonggi-do (KR)

( * ) Notice: Subject to any disclaimer, the term of this patent is extended or adjusted under 35 U.S.C. 154(b) by 263 days.

(21) Appl. No.: 17/879,497

(22) Filed: Aug. 2, 2022

(65) Prior Publication Data

US 2023/0039542 A1 Feb. 9, 2023

(30) Foreign Application Priority Data

Aug. 4, 2021 (KR) .................. 10-2021-0102664
Jul. 21, 2022 (KR) .................. 10-2022-0090608

(51) Int. Cl.
*H04N 25/771* (2023.01)
*H04N 25/533* (2023.01)
(Continued)

(52) U.S. Cl.
CPC ......... *H04N 25/771* (2023.01); *H04N 25/533* (2023.01); *H04N 25/58* (2023.01);
(Continued)

(58) Field of Classification Search
None
See application file for complete search history.

(56) References Cited

U.S. PATENT DOCUMENTS 9,515,115 B2 12/2016 Maruyama
10,044,960 B2 8/2018 Mao et al.
(Continued)

FOREIGN PATENT DOCUMENTS

JP 2018-186398 A 11/2018
KR 102060194 B1 12/2019

OTHER PUBLICATIONS

Extended European Search Report issued on Dec. 1, 2022 in European Application No. 22187800.2.
(Continued)

*Primary Examiner* — Mark T Monk
(74) *Attorney, Agent, or Firm* — Harness, Dickey & Pierce, P.L.C.

(57) ABSTRACT

Provided is a pixel array including a plurality of pixels, each of which includes a photodiode configured to generate a photocharge in a frame including a plurality of unit frames, a floating diffusion node configured to receive the photocharge, a first storage capacitor configured to receive and store a first photocharge generated by the photodiode through the floating diffusion node during a first unit accumulation time period in each of the plurality of unit frames, and a second storage capacitor configured to receive and store a second photocharge generated by the photodiode through the floating diffusion node during a second unit accumulation time period in each of the plurality of unit frames.

18 Claims, 14 Drawing Sheets

(51) Int. Cl.
*H04N 25/58* (2023.01)
*H04N 25/75* (2023.01)
*H04N 25/772* (2023.01)
*H04N 25/79* (2023.01)

(52) U.S. Cl.
CPC ........... *H04N 25/75* (2023.01); *H04N 25/772* (2023.01); *H04N 25/79* (2023.01)

(56) References Cited

U.S. PATENT DOCUMENTS

| | | |
|---|---|---|
| 10,110,840 B2 | 10/2018 | Velichko |
| 10,128,286 B2 | 11/2018 | Fowler |
| 10,136,084 B1 | 11/2018 | Solheim et al. |
| 10,397,500 B1 | 8/2019 | Xu et al. |
| 10,404,928 B2 | 9/2019 | Cheung et al. |
| 10,411,063 B2 | 9/2019 | Yang et al. |
| 10,567,689 B2 | 2/2020 | Velichko |
| 10,791,292 B1 | 9/2020 | Geurts |
| 10,904,467 B2 | 1/2021 | Geurts |
| 2008/0175580 A1* | 7/2008 | Kita ............... H04N 23/56 348/E5.022 |
| 2013/0135486 A1 | 5/2013 | Wan |
| 2016/0044258 A1* | 2/2016 | Kim ............... H04N 25/533 348/296 |
| 2019/0349547 A1 | 11/2019 | Velichko |
| 2020/0053309 A1 | 2/2020 | Takatsuka et al. |
| 2020/0286945 A1 | 9/2020 | Palaniappan et al. |

OTHER PUBLICATIONS

Communication pursuant to Article 94(3) EPC issued on May 3, 2024 in European Application No. 22187800.2.
Office Action issued Jul. 1, 2025 in Japanese Application No. 2022-123944.

* cited by examiner

PIXEL ARRAY ACCUMULATING PHOTOCHARGES IN EACH UNIT FRAME, AND IMAGE SENSOR INCLUDING THE PIXEL ARRAY

CROSS-REFERENCE TO RELATED APPLICATION

This application is based on and claims priority under 35 U.S.C. § 119 to Korean Patent Application No. 10-2021-0102664, filed on Aug. 4, 2021 and to Korean Patent Application No. 10-2022-0090608, filed on Jul. 21, 2022 in the Korean Intellectual Property Office, the disclosures of each of which are incorporated by reference herein in their entirety.

BACKGROUND

The inventive concepts relate to image sensors, and more particularly, to a pixel array that accumulates photocharges in each unit frame, and an image sensor including the pixel array.

Image sensors are devices for capturing a two-dimensional (2D) or three-dimensional (3D) image of an object. Image sensors generate an image of an object by using a photoelectric conversion device that reacts according to the intensity of light reflected by the object. With the recent development of the computer industry and the communication industry, the demand for image sensors having improved performance is increasing in various electronic devices, such as digital cameras, camcorders, personal communication systems (PCSs), game players, surveillance cameras, medical micro-cameras, mobile phones, etc.

Image sensors may generate a high dynamic range (HDR) image by generating image data of high illuminance to low illuminance by accumulating photocharges corresponding to a plurality of exposure time periods.

SUMMARY

The inventive concepts provide an image sensor that generates a high dynamic range (HDR) image from photocharges generated in at least one photodiode and at the same time performing a light emitting diode (LED) flicker mitigation (LFM) function.

According to an aspect of the inventive concept, there is provided a pixel array including a plurality of pixels, each of which includes a photodiode configured to generate a photocharge in a frame including a plurality of unit frames, a floating diffusion node configured to receive the photocharge, a first storage capacitor configured to receive and store a first photocharge generated by the photodiode through the floating diffusion node during a first unit accumulation time period in each of the plurality of unit frames, and a second storage capacitor configured to receive and store a second photocharge generated by the photodiode through the floating diffusion node during a second unit accumulation time period in each of the plurality of unit frames.

According to an embodiment, the image sensor comprises a controller (e.g., a pixel controller) configured to control one or more transistors within each pixel for controlling the pixel. The controller may be configured to control each pixel to store the first photocharge in the first storage capacitor during the first unit frame and to store the second photocharge in the second storage capacitor during the second unit frame.

According to another aspect of the inventive concept, there is provided an image sensor comprising a pixel array including a plurality of pixels, each of which including a first photodiode configured to generate a first photocharge for a first unit accumulation time period in each of a plurality of unit frames included in a frame, a second photodiode configured to generate, in each of the plurality of unit frames, a second photocharge for a second unit accumulation time period and generate a third photocharge for a third unit accumulation time period, at least one floating diffusion node configured to receive at least one of the first photocharge, the second photocharge, and the third photocharge, a first storage capacitor configured to receive and store the second photocharge through the at least one floating diffusion node, and a second storage capacitor configured to receive and store the third photocharge through the at least one floating diffusion node.

BRIEF DESCRIPTION OF THE DRAWINGS

Example embodiments of the inventive concepts will be more clearly understood from the following detailed description taken in conjunction with the accompanying drawings in which.

DETAILED DESCRIPTION OF THE EMBODIMENTS

Figure 1:
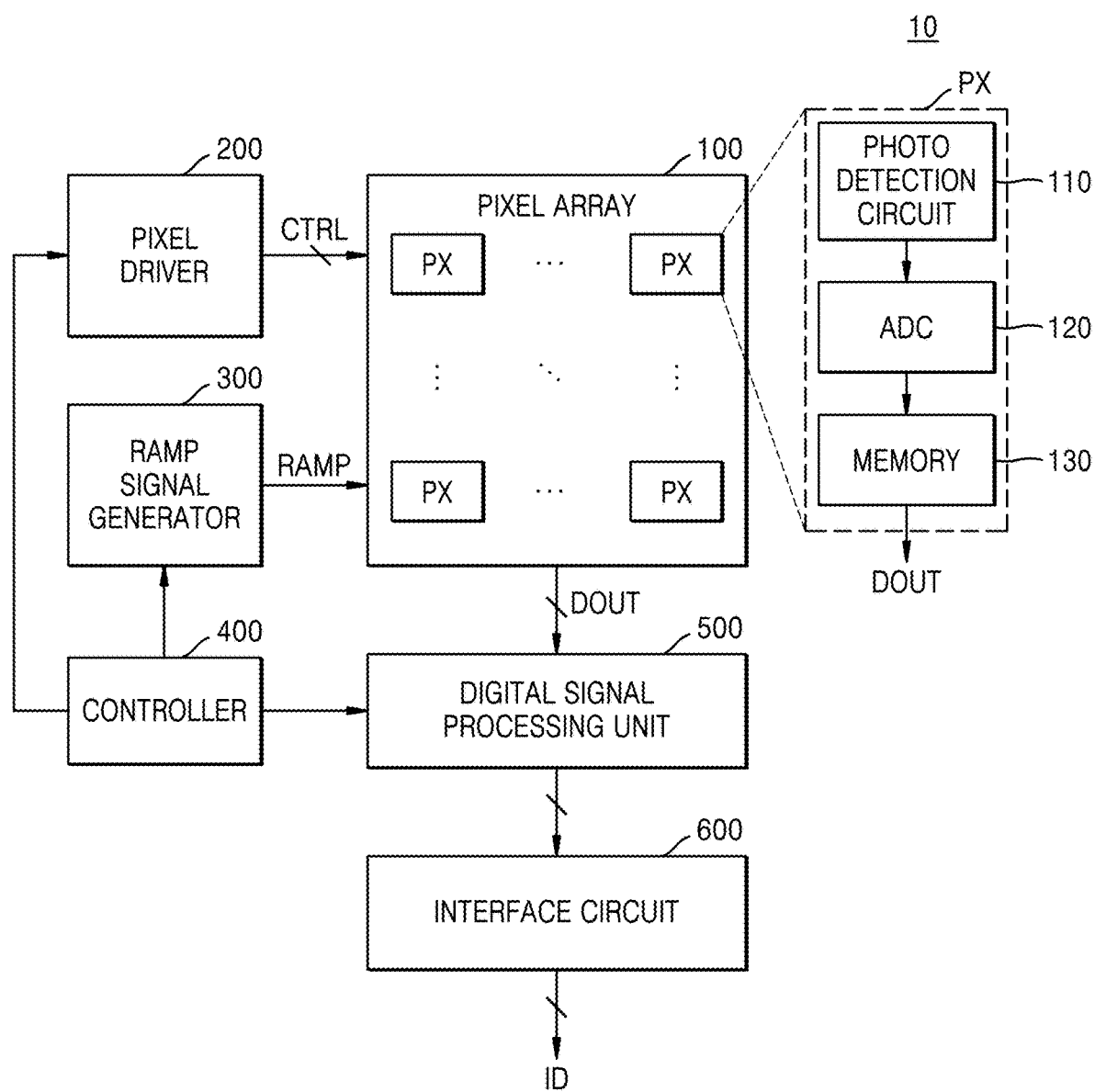
FIG. 1 is a block diagram of a schematic structure of an image sensor according to some example embodiments.

Hereinafter, the inventive concepts will be described more fully with reference to the accompanying drawings, in which some example embodiments of the inventive concepts are shown. In the drawings, like numerals and abbreviations refer to like elements throughout. The repeated descriptions may be omitted. When the term "about" is used in this specification in connection with a numerical value, it is intended that the associated numerical value include a tolerance of ±10% around the stated numerical value.

FIG. 1 is a block diagram of a schematic structure of an image sensor 10 according to some example embodiments.

A pixel PX shown in FIG. 1 may be a digital pixel providing a global shutter function, which is an example of a pixel including a capacitor.

The image sensor 10 may be mounted on (and/or in) an electronic device having an image and/or light sensing function. For example, the image sensor 10 may be mounted on an electronic device such as a camera, a camcorder, a personal communication system such as a mobile phone, a smartphone and/or a personal digital assistant (PDA), a wearable device, an Internet of Things (IoT) device, a tablet personal computer (PC), a game player, a portable multi-media player (PMP), a navigation device, and/or the like. The image sensor 10 may also be mounted on (and/or in) an electronic device that is included as a component in vehicles, furniture, manufacturing equipment, doors, various types of measuring devices, and/or the like.

The image sensor 10 may include a pixel array 100, a pixel driver 200, a ramp signal generator 300, a controller 400, a data signal processing unit 500, and an interface circuit 600. The pixel array 100 may include a plurality of pixels PX, each of which may be configured to sense an external optical signal (e.g., light) and output a digital output signal DOUT corresponding to the sensed optical signal.

Each of the plurality of pixels PX may sense the optical signal using a photo sensing device and convert an optical signal into a digital output signal DOUT (e.g., an electrical signal). Each of the plurality of pixels PX may sense light in a specific spectral range. For example, the plurality of pixels PX may include a red pixel for converting light having a red spectral range into an electrical signal, a green pixel for converting light having a green spectral range into an electrical signal, and a blue pixel for converting light having a blue spectral range into an electrical signal. A color filter configured to transmit light having a specific spectral range and/or a microlens configured to condense light may be arranged on each of the plurality of pixels PX.

The pixel PX may include a photodetection circuit 110, an analog-to-digital converter (ADC) 120, and a memory 130. According to some embodiments, the pixel array 100 may include a first semiconductor substrate and a second semi-conductor substrate that are stacked one on another. For example, the photodetection circuit 110 of the pixel PX may be formed on the first semiconductor substrate, and the ADC 120 that converts a signal generated by the photodetection circuit 110 into a digital signal may be formed on the second semiconductor substrate different from the first semiconductor substrate. Photodetection circuits formed on the first semiconductor substrate may be respectively connected to ADCs formed on the second semiconductor substrate through an electrical connection means so that detection signals may be transmitted. According to some embodiments, the electrical connection means may include a through silicon via (TSV) penetrating the first semiconductor substrate and/or a connection structure of metals respectively formed on the first semiconductor substrate and the second semiconductor substrate. According to some embodiments, the memory 130 may be formed on the second semiconductor substrate. The photodetection circuit 110 may include a photo sensing device, and may convert the optical signal into an electrical signal (e.g., into a detection signal) that is an analog signal. For example, the photo sensing device may include at least one of a photo-diode, a phototransistor, a photogate, and/or a pinned photodiode. The detection signal may include, for example, a detection signal caused by a reset operation on the pixel PX and/or a detection signal caused by a photodetection operation on the pixel PX.

The ADC 120 may convert the detection signal output by the photodetection circuit 110 into a digital signal. In some embodiments, the ADC 120 may convert the detection signal into the digital signal by comparing the detection signal with a ramp signal RAMP, and the memory 130 may store the digital signal. The memory 130 may output the digital output signal DOUT to the data signal processing unit 500.

The image sensor 10 may accumulate photocharges during a unit accumulation time period (e.g., a certain percentage of a unit frame) in each of a plurality of unit frames into which one frame is divided, and may generate image data, based on photocharges accumulated during a plurality of the unit accumulation time periods. At this time, the image sensor 10 may generate an HDR image by accumulating photocharges in unit accumulation time periods having different time lengths in one unit frame. A frame may be a period of time which is divided into a plurality of unit frames (sub-periods). A photocharge may be a charge generated by a photo sensing device (e.g., from converting incident light into charge).

The pixel driver 200 may output control signals CTRL for controlling the plurality of pixels PX included in the pixel array 100. In response to receiving the control signals CTRL generated by the pixel driver 200, each of the plurality of pixels PX may generate a detection signal, convert the detection signal into a digital signal by using the ramp signal RAMP, store the digital signal, and output the stored digital signal as the digital output signal DOUT.

The ramp signal generator 300 may generate the ramp signal RAMP and output the ramp signal RAMP to the pixel array 100. The ramp signal RAMP may be provided to the pixel array 100 (e.g., to the ADC(s) 120 of the pixel(s) PX) and used as a reference signal to be compared with the detection signal. According to some example embodiments, the ramp signal RAMP may be a constantly decreasing and/or increasing signal (e.g., a signal that increases or decreases with a single and/or linear slope).

The controller 400 may control overall operations of the image sensor 10. For example, the controller 400 may control an operating timing of the image sensor 10, based on control information received from an external device (e.g., an image signal processor (ISP) and an application processor (AP)) through the interface circuit 600. The pixel driver 200 and the ramp signal generator 300 may respectively generate the control signals CTRL and the ramp signal RAMP, based on timing signals provided by the controller 400.

The digital signal processing unit 500 may perform a digital signal processing operation on the digital output signals DOUT received from the pixel array 100 and provide final image data ID to the external device. The digital output signal DOUT may include a reset value caused by the reset operation on the pixel PX and an image signal value caused by the photodetection operation on the pixel PX. The digital signal processing unit 500 may perform an operation on the reset value and the image signal value to determine a final digital value corresponding to an optical signal sensed by one pixel PX. By combining the final digital values respectively determined by the plurality of pixels PX, the final image data ID may be generated. For example, a correlated double sampling (CDS) operation may be implemented by using the digital signal processing operation of the digital signal processing unit 500 and the digital output signal DOUT, which is generated due to the operation of the ADC 120 included in the pixel PX.

The interface circuit 600 may be configured to receive control information from the external device or output the final image data ID to the external device. According to some example embodiments, the interface circuit 600 may transmit and receive the above-described pieces of information to and from the external device, based on a predetermined protocol.

Figure 2:
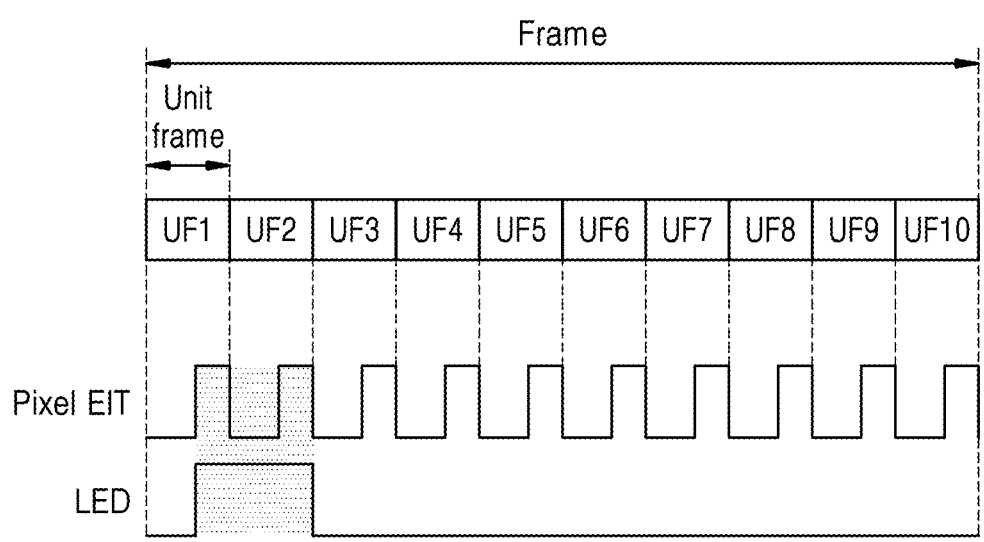
FIG. 2 is a graph showing an example of generating image data for a light emitting diode (LED) light source by accumulating photocharges in each of a plurality of unit frames, according to some example embodiments.

FIG. 2 is a graph showing an example of generating image data ID for a light emitting diode (LED) light source by accumulating photocharges in each of a plurality of unit frames, according to some example embodiments.

Referring to FIG. 2, the image sensor 10 may accumulate photocharges during a plurality of unit accumulation time periods in order to generate the image data ID for the LED light source. The LED light source may be repeatedly turned on and/or off at certain intervals, for example, at a frequency of 90 Hz or greater. For energy efficiency, a time period during which the LED light source is turned on may be shorter than a time period during which the LED light source is turned off. In some example embodiments, the period of time during which the LED light source is turned off may be about an order of magnitude greater than the period of time during which the LED light source is turned on. For example, in some example embodiments, in a frame wherein the LED light source is turned off at intervals of about 10 ms, the time period during which the LED light source is turned on may be about 1 ms.

According to a comparative embodiment, when the image sensor 10 obtains the HDR image according to a multi-exposure method, a photodiode may generate photocharges during a plurality of exposure time periods in one frame. For example, the photodiode may generate photocharges during a short exposure time period in order to generate a high-illuminance image, and may generate photocharges during a long exposure time period in order to generate a low-illuminance image.

Thus, when the image sensor 10 obtains the HDR image for the LED light source according to the multi-exposure method, a short exposure time period for generating a high-illuminance image may be included in the time period during which the LED light source is turned off. During this time period, the image sensor 10 does not generate the high-illuminance image.

A photodiode may generate photocharges corresponding to a frame, and a floating diffusion node connected to the photodiode may accumulate (for example, receive) photocharges generated during a unit accumulation time period corresponding to a certain time period of each of a plurality of unit frames into which one frame is divided. At this time, a length of each unit frame may be shorter than a time period during which the LED light source is turned on. Accordingly, because the image sensor 10 may generate photocharges corresponding to when the LED light source is turned on, the image sensor 10 may generate an HDR image correctly from the LED light source that periodically flickers.

A circuit structure used by the image sensor 10 to generate the HDR image will now be described.

FIGS. 3A through 3E are circuit diagrams of a structure of a pixel PX according to some example embodiments.

The embodiments according to FIGS. 3A through 3E may be circuits capable of generating an HDR image for an LED light source by receiving photocharges generated by a plurality of photodiodes, namely, first and second photodiodes PD1 and PD2, in first and second floating diffusion nodes FD1 and FD2. Although the embodiments relating to generating photocharges in the first and second photodiodes PD1 and PD2 are described with reference to FIGS. 3A through 3E, the number of photodiodes according to some example embodiments are not limited thereto.

Each of photodetection circuits 110*a* through 110*e* of the pixel PX according to FIGS. 3A through 3E may include the first photodiode PD1 and the second photodiode PD2. According to some example embodiments, the sensitivity of the first photodiode PD1 and the sensitivity of the second photodiode PD2 may be different from each other to generate the HDR image. For example, the sensitivity of each photodiode may depend on the size of the photodiode. The first photodiode PD1 may be a high-sensitivity photodiode for generating a low-illuminance image, and the second photodiode PD2 may be a low-sensitivity photodiode for generating a high-illuminance image.

Figure 3A:
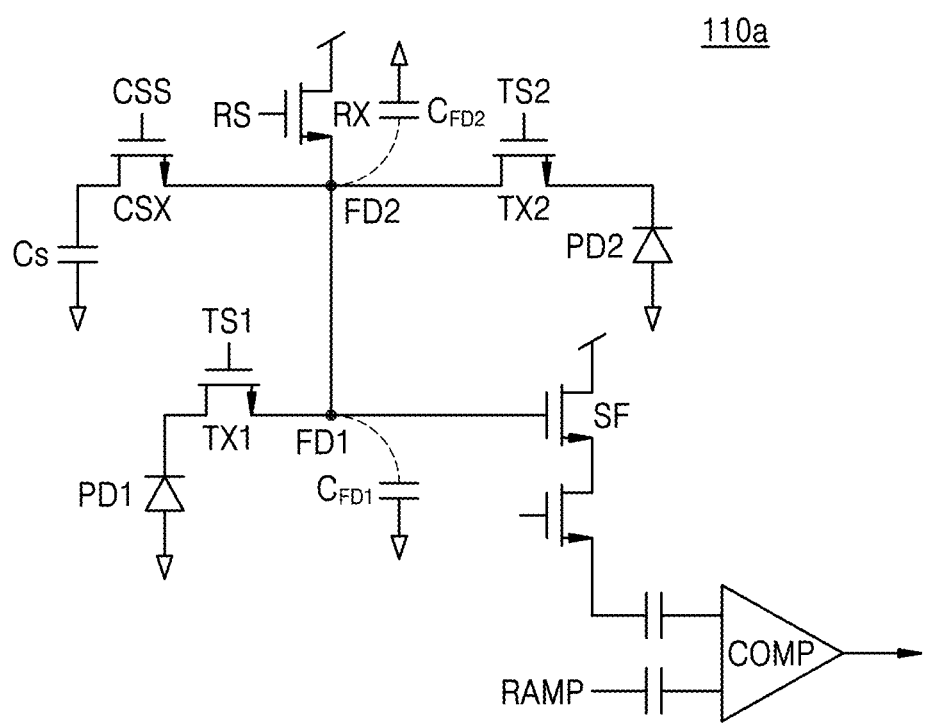
FIGS. 3A through 3E are circuit diagrams of a structure of a pixel according to some example embodiments.

Referring to FIG. 3A, the photodetection circuit 110*a* may include a first transfer transistor TX1 and a second transfer transistor TX2. When the first transfer transistor TX1 connected to the first photodiode PD1 is activated, the first transfer transistor TX1 may transmit photocharges generated in the first photodiode PD1 to the first floating diffusion node FD1. When the second transfer transistor TX2 connected to the second photodiode PD2 is activated, the second transfer transistor TX2 may transmit photocharges generated in the second photodiode PD2 to the second floating diffusion node FD2.

The first floating diffusion node FD1 and the second floating diffusion node FD2 may include a first capacitor $C_{FD1}$ and a second capacitor $C_{FD2}$, respectively. The first capacitor $C_{FD1}$ and the second capacitor $C_{FD2}$ may accumulate (for example, store) the photocharges transmitted by the first photodiode PD1 and the second photodiode PD2, respectively. In some embodiments, each of the first capacitor $C_{FD1}$ and the second capacitor $C_{FD2}$ may be a parasitic capacitor having a parasitic capacitance.

The first floating diffusion node FD1 and the second floating diffusion node FD2 of the photodetection circuit 110*a* may be connected to each other, and the first floating diffusion node FD1 and the second floating diffusion node FD2 may be connected to a charge sharing transistor CSX. The charge sharing transistor CSX may share the photocharges generated in the first capacitor $C_{FD1}$ and the second capacitor $C_{FD2}$ with the storage capacitor Cs by being activated in each unit frame.

The photodetection circuit 110*a* may further include a reset transistor RX, and, when the reset transistor RX is activated, the first floating diffusion node FD1 and the second floating diffusion node FD2 may be reset. According to some example embodiments, after electrical charges are shared in the storage capacitor Cs, electrical charges of the first floating diffusion node FD1 and the second floating diffusion node FD2 may be emitted (e.g., grounded) by the reset transistor RX, and the first floating diffusion node FD1 and the second floating diffusion node FD2 may receive photocharges generated in subsequent unit frames.

The second transfer transistor TX2 may transmit the photocharges generated in the second photodiode PD2 to the second floating diffusion node FD2 in each unit frame of FIG. 2, and/or may accumulate the photocharges generated in the second photodiode PD2 with the storage capacitor Cs by the charge sharing transistor CSX activated in each unit frame. The first transfer transistor TX1 may be activated during a read operation performed in each frame and thus may provide the photocharges accumulated in the first photodiode PD1 to the first floating diffusion node FD1 and the second floating diffusion node FD2.

For example, the photocharges generated in the second photodiode PD2 may be stored in the storage capacitor Cs through the second floating diffusion node FD2 in an accumulation operation, and the photocharges generated in the first photodiode PD1 may be read through the first floating diffusion node FD1 in a read operation after the accumulation operation. In addition, the photocharges generated by the second photodiode PD2 and stored in the storage capacitor Cs may be read in a read operation (or a read phase). Accordingly, the photocharges generated in the first photodiode PD1 and the photocharges generated in the second photodiode PD2 may be read independently each other.

In the read operation, based on the potential of photocharges accumulated in the floating diffusion nodes FD1 and/or FD2, a source follower SF may transmit a detection signal to an output node. The source follower SF may amplify a change in a voltage of the floating diffusion node FD1 and/or FD2. The source follower SF may be connected to the output node, and may provide a current path along which a current of the source follower SF flows according to a selection control signal output by the pixel driver 200. A selection transistor (not shown) in the photodetection circuit may provide the signal (for example, the change in the voltage) amplified by the source follower SF to the ADC based on a logic level of a selection signal.

The ADC may be, for example, a single slope ADC. The ADC may include a comparator COMP, a first capacitor, and a second capacitor. The comparator COMP may include a differential amplifier. A first input terminal of the comparator COMP may receive a detection signal as a first input signal via the first capacitor, and a second input terminal of the comparator COMP may receive the ramp signal RAMP as a second input signal via the second capacitor. The comparator COMP may compare the detection signal to the ramp signal RAMP received via the first and second capacitors to output a comparison result signal.

The image sensor 10 may generate a digital signal corresponding to a photocharges of the first photodiode PD1 and a digital signal corresponding to a photocharges of the second photodiode PD2, according to the comparison result signal. The image sensor 10 may generate the image data ID by combining digital signals generated by the plurality of pixels PX. At this time, the image sensor 10 may generate image data ID of a first illuminance, based on the comparison result signal output by the first photodiode PD1, and may generate image data ID of a second illuminance, based on the comparison result signal output by the second photodiode PD2.

Figure 3B:
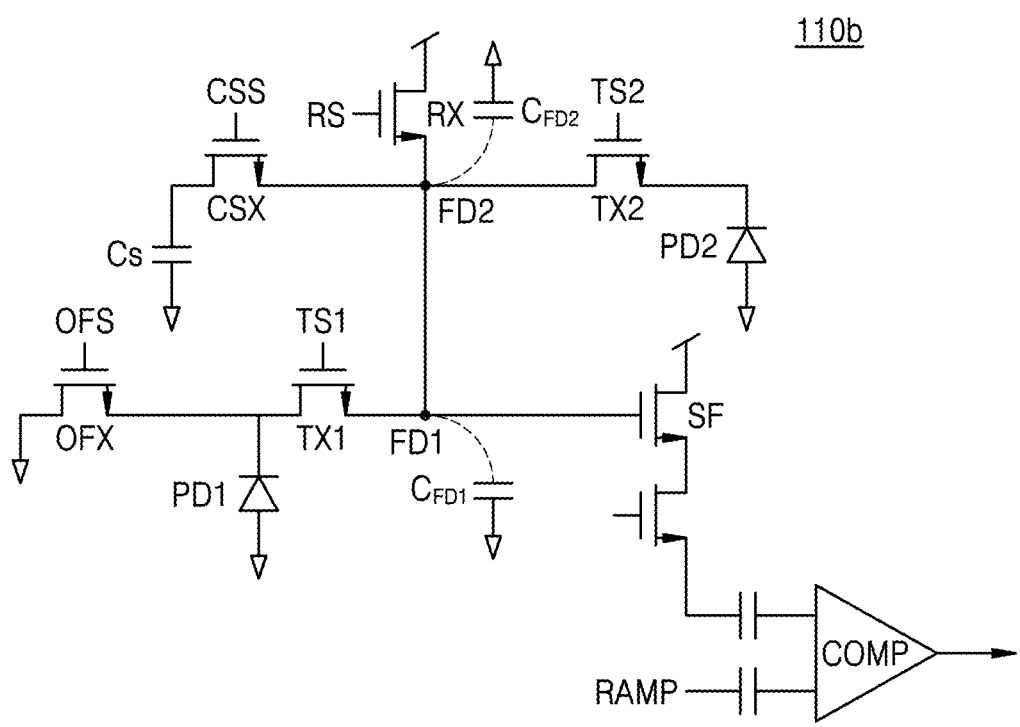

Referring to FIG. 3B, the photodetection circuit 110b may further include an overflow transistor OFX in addition to the components of the photodetection circuit 110a of FIG. 3A. The overflow transistor OFX may be connected to the first photodiode PD1, and may emit some of the photocharges generated in the first photodiode PD1 when activated.

Figure 3C:
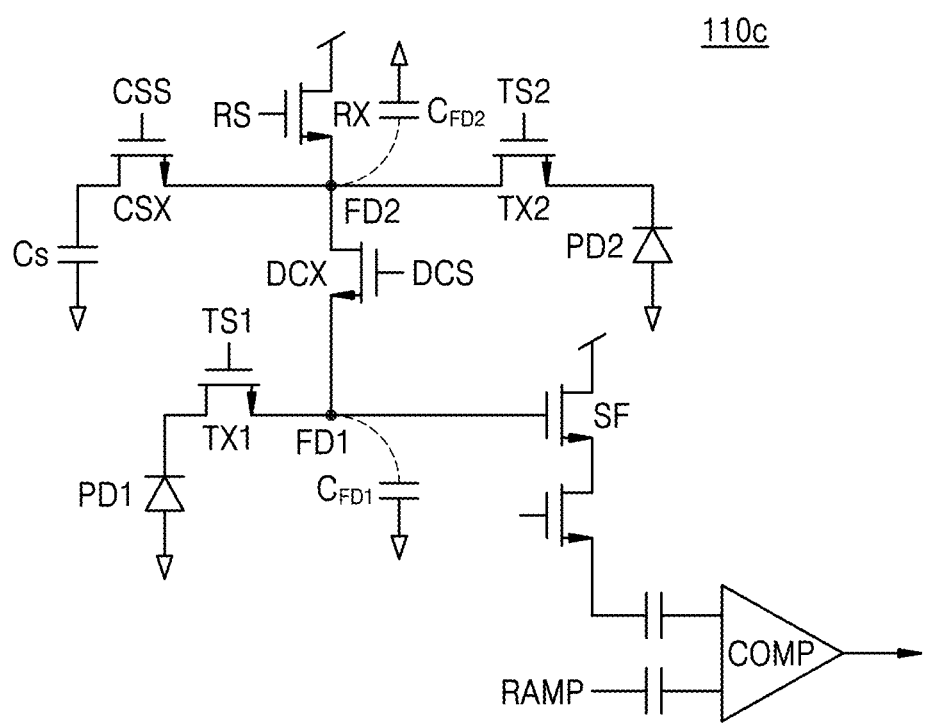

Referring to FIG. 3C, the photodetection circuit 110c may further include a dual conversion transistor DCX in addition to the components of the photodetection circuit 110a of FIG. 3A. According to some example embodiments, the dual conversion transistor DCX may be referred to as a gain control transistor. When the dual conversion transistor DCX is activated (e.g., by a dual conversion signal ("DCS")), the first floating diffusion node FD1 may be connected to the second floating diffusion node FD2. When the dual conversion transistor DCX is deactivated, the photocharges generated in the first photodiode PD1 may be transmitted only in the first capacitor $C_{FD1}$, and the photocharges generated in the second photodiode PD2 may be transmitted only in the second capacitor $C_{FD2}$.

According to some example embodiments, when the photocharges accumulated in the first photodiode PD1 are read and the dual conversion transistor DCX is deactivated, the photocharges of the first photodiode PD1 may be transmitted in the first floating diffusion node FD1, and a voltage level formed by the first capacitor $C_{FD1}$ may be input to a gate of the source follower SF. On the other hand, when the dual conversion transistor DCX is activated, the photocharges of the first photodiode PD1 may be transmitted in the first floating diffusion node FD1 and the second floating diffusion node FD2, and a voltage level formed by the first capacitor $C_{FD1}$ and the second capacitor $C_{FD2}$ may be input to the gate of the source follower SF. Because a capacitance of the first capacitor $C_{FD1}$ and the second capacitor $C_{FD2}$ connected to each other in parallel is greater than that of the first capacitor $C_{FD1}$, a voltage of a lower level may be formed when the dual conversion transistor DCX is activated than when the dual conversion transistor DCX is deactivated. In other words, according to whether the dual conversion transistor DCX is activated, the image sensor 10 may control a conversion gain of photocharges.

Figure 3D:
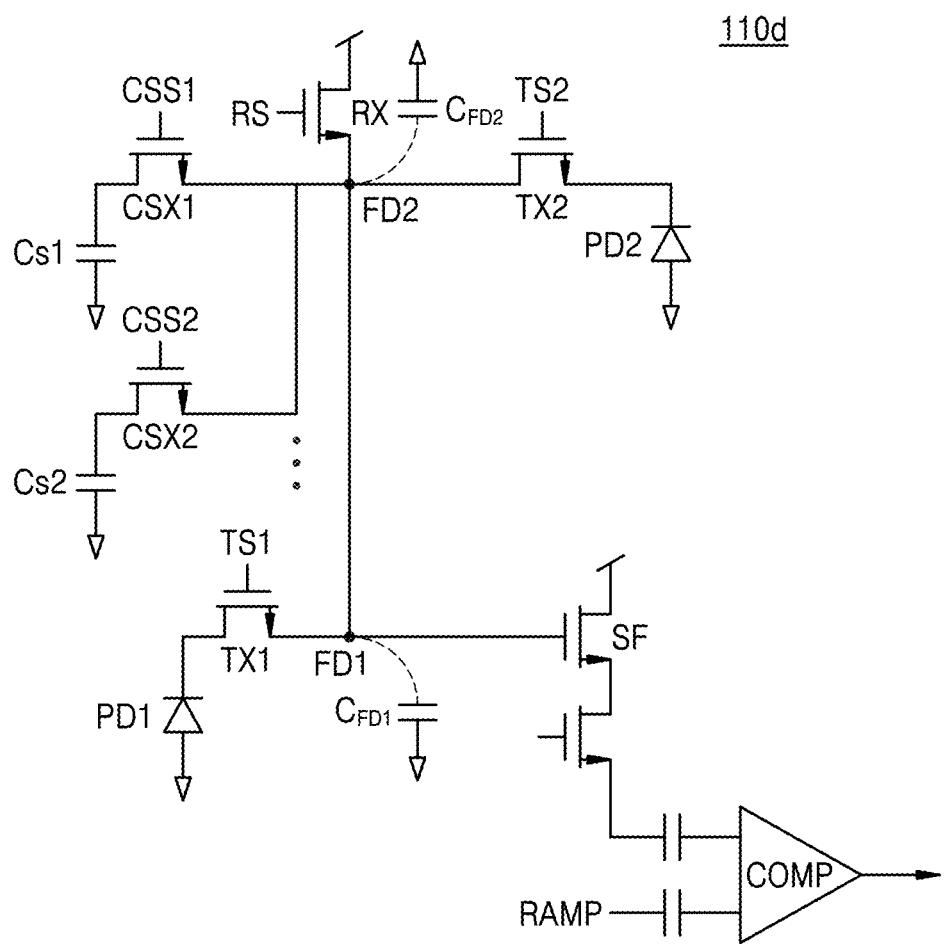

Referring to FIG. 3D, the photodetection circuit 110d may include a plurality of storage capacitors Cs (Cs1, Cs2, . . . etc.). Though illustrated as only including two storage capacitors Cs1 and Cs2, the example embodiments are not so limited, the plurality of storage capacitors Cs may include two or more capacitors Cs. According to some example embodiments, the image sensor 10 may include, in each unit frame, unit accumulation time periods allocated to have different time lengths, and the photocharges generated in the second photodiode PD2 during different unit accumulation time periods may be stored in the different storage capacitors Cs. For example, the photocharges accumulated during a first unit accumulation time period may be stored in a first storage capacitor Cs1, and the photocharges accumulated during a second unit accumulation time period may be stored in a second storage capacitor Cs2. A method, performed by the photodetection circuit 110d, of storing photocharges in the plurality of storage capacitors Cs according to the embodiment of FIG. 3D will be described later with reference to FIG. 8.

Figure 3E:
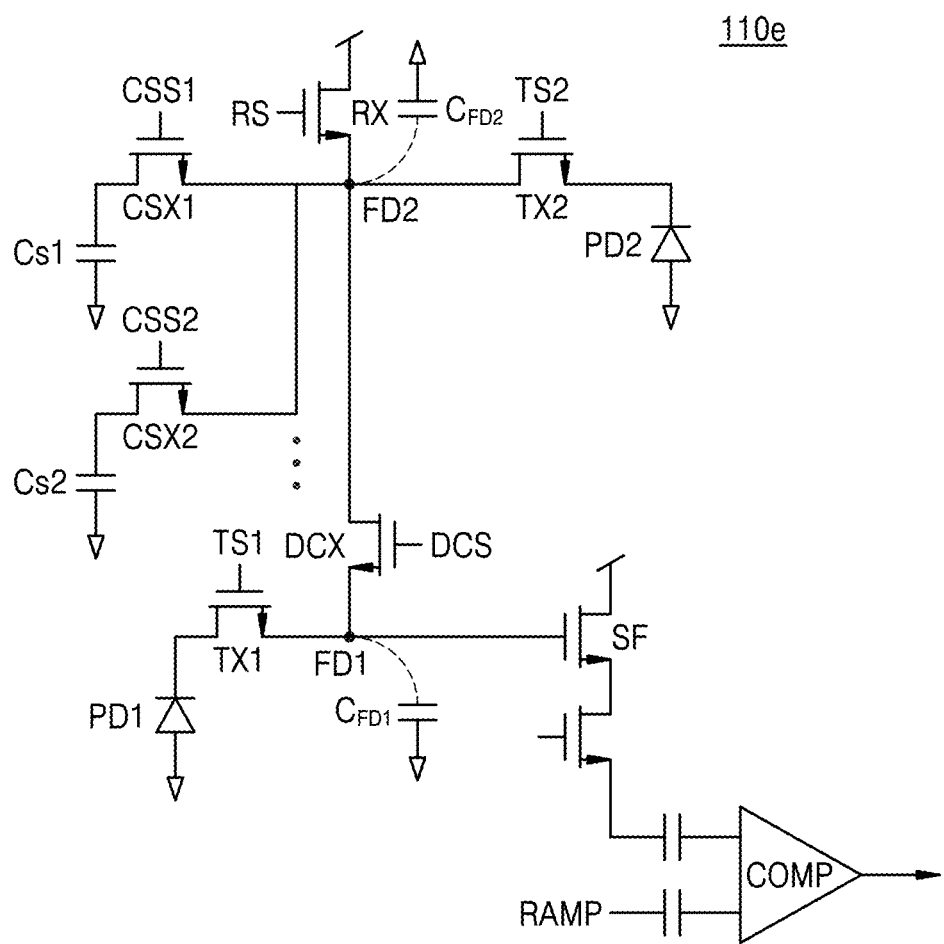

Referring to FIG. 3E, the photodetection circuit 110e may further include a dual conversion transistor DCX in addition to the components of the photodetection circuit 110d of FIG. 3D. When the dual conversion transistor DCX is activated, the first floating diffusion node FD1 may be connected to the second floating diffusion node FD2. When the dual conversion transistor DCX is deactivated, the photocharges generated in the first photodiode PD1 may be transmitted only in the first capacitor $C_{FD1}$ connected to the first floating diffusion node FD1, and the photocharges generated in the second photodiode PD2 may be transmitted only in the second capacitor $C_{FD2}$ connected to the second floating diffusion node FD2. In a pixel circuit of FIG. 3E, during an effective integration time (EIT) in the accumulation operation, the first photodiode PD1 may generate photocharges, and the second photodiode PD2 may store, in a plurality of storage capacitors, charges generated during a plurality of sub-EITs divided from the EIT. In the read operation, the photocharges generated in the first photodiode PD1 may be read out, and the photocharges generated in the second photodiode PD2 may be read through the charges stored in storage capacitors. A detailed description of the read operation will be described later with reference to FIG. 6.

Figure 4:
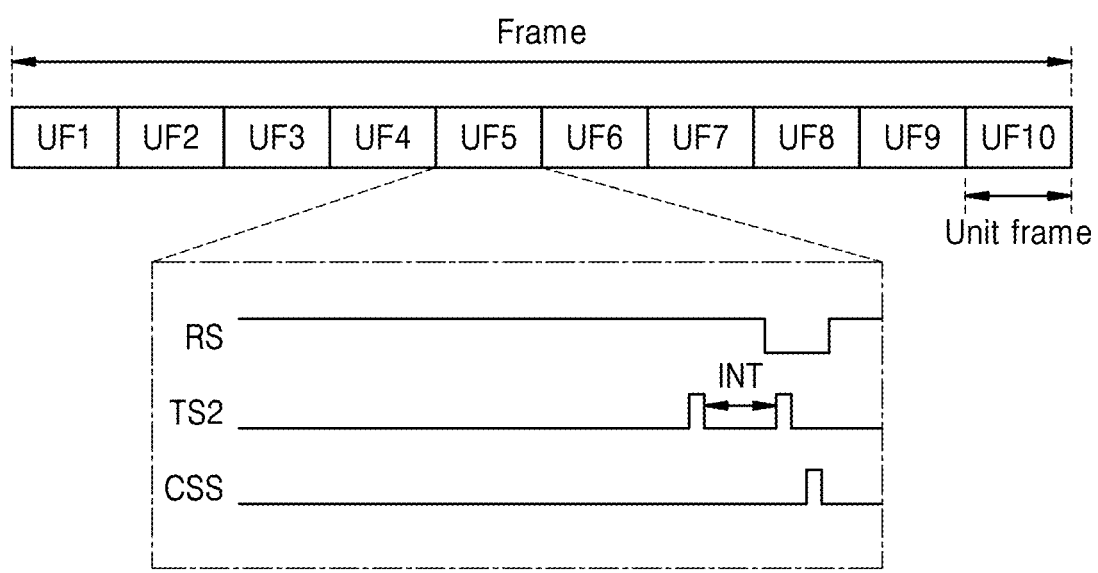
FIG. 4 is a graph showing respective levels of pixel control signals generated in each unit frame of a frame in an accumulation operation, according to some example embodiments.

FIG. 4 is a graph showing respective levels of signals generated in each unit frame of a frame in an accumulation operation (or an accumulation phase), according to some example embodiments.

Referring to FIG. 4, one frame in the accumulation operation may include a plurality of unit frames, and the image sensor 10 may generate the image data ID by reading the photocharges accumulated during the plurality of unit frames in a read operation following the accumulation operation. An accumulation operation of the image sensor 10 will be described with reference to FIGS. 4 through 5B, and a reading operation of the image sensor 10 will be described with reference to FIG. 6.

According to some example embodiments, when the image sensor 10 generates photocharges through the plurality of photodiodes, in the accumulation operation, some of the plurality of photodiodes may transmit photocharges to floating diffusion nodes and store the photocharges in a storage capacitor in each unit frame, and the remaining photodiodes may generate and accumulate photocharges during a plurality of unit frames to floating diffusion nodes. The photocharges may be transmitted to a floating diffusion node in the read operation. Referring to FIGS. 3A through 3E, the first photodiode PD1 may transmit the photocharges generated during the plurality of unit frames of the accumulation operation to the first floating diffusion node FD1 in the read operation, and the second photodiode PD2 may transmit the photocharges generated in each unit frame of the accumulation operation to the second floating diffusion node FD2 and the photocharges may be stored in the storage capacitor. However, the number of photodiodes according to the example embodiments is not limited thereto.

According to some example embodiments, the plurality of photodiodes may generate photocharges during the same exposure time periods. Although a case of generating photocharges during a time period corresponding to the entirety of one frame will be described hereinafter, an exposure time period according to the present embodiment is not limited thereto, and a case of generating photocharges during a portion of a time period corresponding to one frame may be included.

The image sensor 10 may start an accumulation operation during a unit accumulation time period INT by resetting the photocharges generated in a photodiode. The photocharges generated in the photodiode before the unit accumulation time period INT may be received in a floating diffusion node as a transfer transistor is activated. At this time, when the reset transistor RX is activated, the photocharges received in the floating diffusion node may be reset. For example, referring to FIGS. 3A through 4, when a second transmission signal TS2 of a logic high level is input to the second transfer transistor TX2, the photocharges generated in the second photodiode PD2 may be transmitted to the second floating diffusion node FD2. Thereafter, when the reset signal RS of a logic high level is input to the reset transistor RX, the photocharges generated before the unit accumulation time period INT may be reset.

Thereafter, as the transfer transistor is deactivated, the photodiode may generate and accumulate photocharges. When the transfer transistor is activated, the photocharges generated during the unit accumulation time period INT may be transmitted to the floating diffusion nodes. At this time, the reset transistor RX connected to the floating diffusion node may be deactivated, and thus, the floating diffusion node may receive photocharges generated during the unit accumulation time period INT.

For example, referring to FIGS. 3A through 4, as the second transmission signal TS2 transitions from a logic high level to a logic low level, the second photodiode PD2 may generate and accumulate photocharges during the unit accumulation time period INT, and, when the second transmission signal TS2 transitions from a logic low level back to a logic high level, the photocharges generated during the unit accumulation time period INT may be transmitted to the second floating diffusion node FD2.

According to some example embodiments, as the charge sharing transistor CSX is activated in each unit frame, the image sensor 10 may store, in the storage capacitor(s) Cs, the photocharges accumulated during the unit accumulation time period INT. A time point when the charge sharing transistor CSX is activated may be an arbitrary time point within a time section during which the reset transistor RX is deactivated. A time point when the charge sharing transistor CSX is deactivated may be an arbitrary time point during a time period from an end point of the unit accumulation time period INT to the time point when the reset transistor RX is activated, after the charge sharing transistor CSX is activated.

For example, referring to FIGS. 3A through 4, as a charge sharing signal CSS transitions to a logic high level after the unit accumulation time period INT, the image sensor 10 may store, in the storage capacitor Cs, the photocharges accumulated in the floating diffusion node during the unit accumulation time period INT. Thereafter, when the charge sharing signal CSS transitions back to a logic low level and the reset signal RS transitions to a logic high level, the photocharges of the floating diffusion node may be reset, and thus an accumulation operation may be performed with respect to a subsequent unit frame.

Figure 5A:
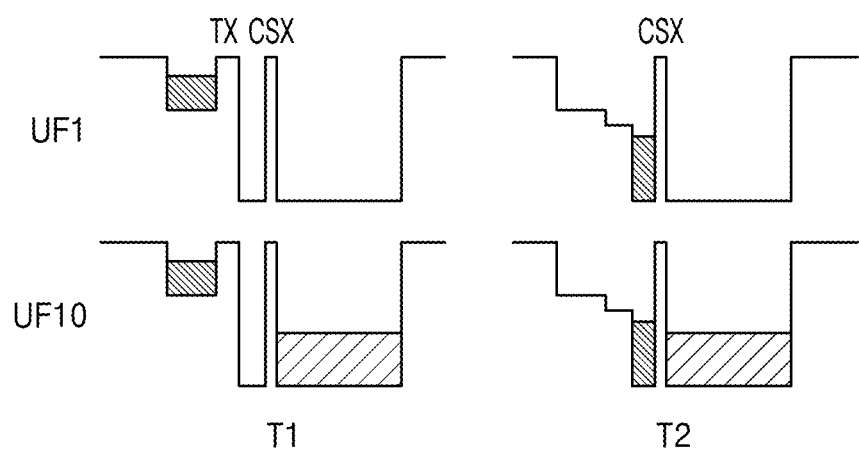
FIG. 5A is a diagram illustrating an example in which photocharges are received in a floating diffusion node according to some example embodiments.
Figure 5B:
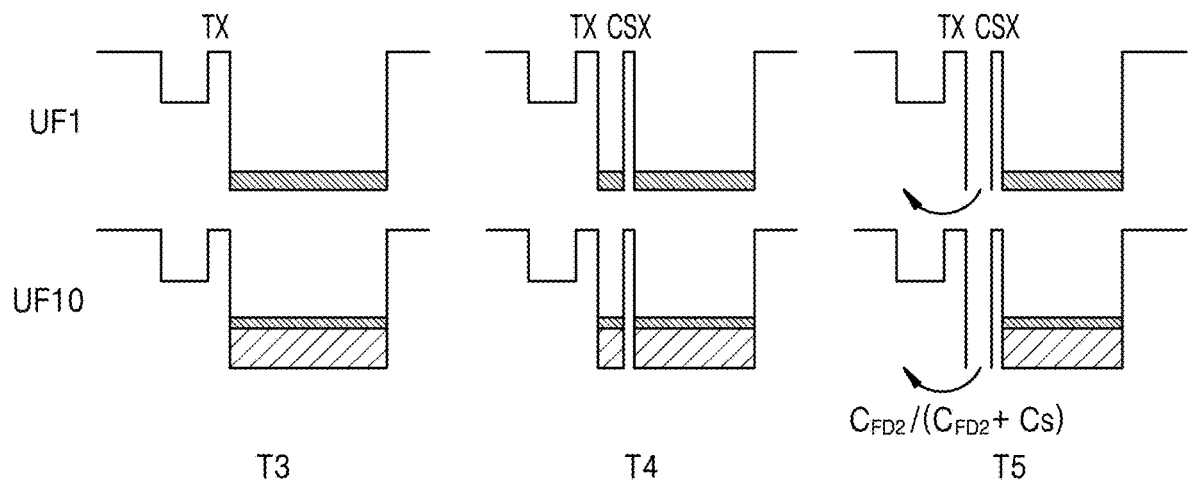
FIG. 5B is a diagram illustrating an example in which the photocharges received in the floating diffusion node are stored in a storage capacitor according to some example embodiments.

FIG. 5A is a diagram illustrating an example in which photocharges are accumulated in a floating diffusion node according to some example embodiments, and FIG. 5B is a diagram illustrating an example in which the photocharges accumulated in the floating diffusion node are stored in the storage capacitor Cs according to some example embodiments.

Referring to FIGS. 3A through 3D and FIGS. 5A and 5B, a potential barrier may be controlled according to voltage levels input to respective gates of the transfer transistor TX, the charge sharing transistor CSX, and the reset transistor RX. For example, when a voltage of a high level is input to a gate of a transistor, a potential barrier of the transistor may be decreased, and thus, electrical charges trapped in a node of a high energy level may be transmitted in a low energy level. On the other hand, when a voltage of a low level is input to the gate of the transistor, the potential barrier of the transistor may be increased, and thus, electrical charges may be trapped in each node.

Referring to FIG. 5A, in a first time section T1, the photodiode of the image sensor 10 may generate photocharges. The first time section T1 may correspond to the unit accumulation time period INT, and the image sensor 10 may reset the photocharges generated in the photodiode before the unit accumulation time period INT. When the transfer transistor TX is deactivated, photocharges may be generated in the photodiode by the potential barrier formed in the transfer transistor TX.

When the transfer transistor TX is activated in a second time section T2, the potential barrier of the transfer transistor TX may be decreased, and thus, photocharges may be transferred from the photodiode to the floating diffusion node. At this time, the charge sharing transistor CSX is deactivated, and thus, the potential barrier of the charge sharing transistor CSX may be increased, and thus, photocharges generated during the unit accumulation time period INT may be received in the floating diffusion node.

Referring to FIG. 5B, as the transfer transistor TX is deactivated in a third time section T3 and the charge sharing transistor CSX is activated, the photocharges received in the floating diffusion node may be shared by the storage capacitor Cs. At this time, an energy level of the floating diffusion node may be the same as an energy level of the storage capacitor Cs, and a capacitance of the storage capacitor Cs may be greater than a capacitance of a parasitic capacitor of the floating diffusion node.

The charge sharing transistor CSX may be deactivated in a fourth time section T4, and a potential barrier between the storage capacitor Cs and the floating diffusion node may be formed. According to some example embodiments, an electrical charge amount stored in each capacitor may be determined according to a ratio between the capacitance of the storage capacitor Cs and the capacitance of the parasitic capacitor, and, when the capacitance of the storage capacitor Cs is greater than the capacitance of the parasitic capacitor, more electrical charges may be stored in the storage capacitor Cs.

The reset transistor RX is activated in a fifth time section T5, and thus, the photocharges stored in the floating diffusion node may be reset. At this time, the charge sharing transistor CSX may be deactivated, and thus, electrical charges stored in the storage capacitor Cs may not be reset, and only electrical charges stored in the floating diffusion node may be reset.

Some of the photocharges generated during the unit accumulation time period INT may be shared by and stored in the storage capacitor Cs in each unit frame. After electrical charges are shared by the storage capacitor Cs, the floating diffusion node may be reset, and thus, the image sensor 10 may accumulate and store photocharges accumulated during the plurality of unit frames. For example, referring to FIG. 5A, in a first unit frame UF1, photocharges generated during the first time section T1 may be shared by and stored in the storage capacitor Cs. In each of subsequent unit frames, the image sensor 10 may add the photocharges generated in the photodiode to the photocharges stored in a previous unit frame and may store a result of the addition. Accordingly, the image sensor 10 may accumulate and store the photocharges generated during the unit accumulation time period INT in each unit frame from the first unit frame UF1 to the last unit frame (for example, a tenth unit frame UF10).

Figure 6:
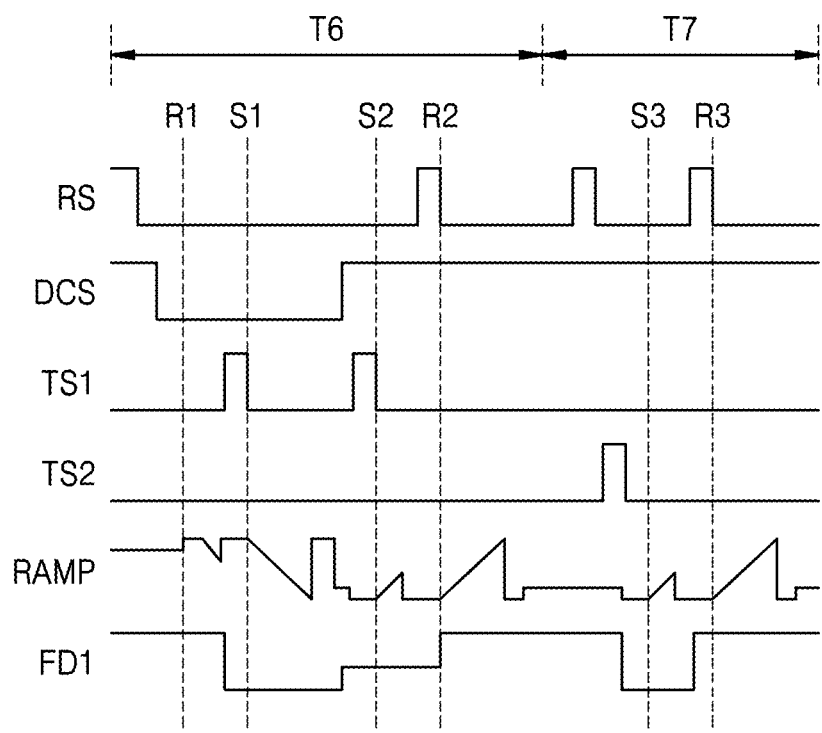
FIG. 6 is a graph showing respective levels of signals formed when an image sensor reads accumulated photocharges in a read operation following an accumulation operation, according to some example embodiments.

FIG. 6 is a graph showing respective levels of signals generated when the image sensor 10 reads accumulated photocharges in a read operation following an accumulation operation, according to some example embodiments.

Referring to FIG. 6, the image sensor 10 may perform, in a sixth time section T6 during a read operation, a dual conversion operation for photocharges generated and accumulated in the first photodiode PD1, and may read, in a seventh time section T7, photocharges stored in correspondence with the unit accumulation time period INT of each unit frame in the second photodiode PD2. Referring to FIGS. 3A through 3E, the image sensor 10 may read the photocharges accumulated in the first photodiode PD1 in the sixth time section T6, and may read the photocharges accumulated in the second photodiode PD2 in the seventh time section T7.

Referring to FIGS. 3C and 3E, in a dual conversion operation, an accumulation gain for the photocharges generated in the first photodiode PD1 may be adjusted according to whether the dual conversion transistor DCX is activated. For example, when the dual conversion transistor DCX is activated, the first floating diffusion node FD1 and the second floating diffusion node FD2 may be connected to each other, and thus, the accumulation conversion gain may be reduced by the first capacitor $C_{FD1}$ and the second capacitor $C_{FD2}$. On the other hand, when the dual conversion transistor DCX is deactivated, electrical charges may be accumulated only in the first floating diffusion node FD1, and thus, the accumulation conversion gain may be increased.

In the sixth time section T6, according to FIGS. 3C and 3E, the image sensor 10 may perform a dual conversion operation with respect to the photocharges generated in the first photodiode PD1. When the reset signal RS and the dual conversion signal DCS each having a logic low level are input to the photodetection circuit 110, the image sensor 10 may convert photocharges to an electrical signal with a high accumulation conversion gain. According to some example embodiments, the image sensor 10 may read (R1) an electrical charge amount received in the first floating diffusion node FD1 after the first floating diffusion node FD1 is reset and may read (S1) an electrical charge amount transmitted to the first floating diffusion node FD1 from the first floating diffusion node FD1.

In response to the dual conversion signal DCS transitioning from the logic low level to the logic high level, the photodetection circuit 110 may read an electrical charge amount accumulated with a low accumulation conversion gain. The photodetection circuit 110 may read (S2) an electrical charge amount of the first photodiode PD1 and read (R2) an electrical charge amount after the first floating diffusion node FD1 is reset, in order to perform CDS.

In the sixth time section T6, when the electrical charge amount accumulated with a high accumulation gain is read, the electrical charge amount accumulated with a low accumulation gain is read, and an electrical charge amount is read at a high accumulation gain and a low accumulation gain, electrical charge amounts in a reset state may also be read at a high accumulation gain and a low accumulation gain, respectively, in order to perform CDS. The photodetection circuit 110 may receive a ramp signal of a low level in order to read (R1) and sample an electrical charge amount in a reset state at a high accumulation gain, and may receive a high-level ramp signal in order to read (S1) and sample an electrical charge amount in an exposure state. The photodetection circuit 110 may also receive a low-level ramp signal in order to read (S2) and sample an electrical charge amount in an exposure state at a low accumulation gain, and may receive a high-level ramp signal in order to read (R2) and sample an electrical charge amount in a reset state.

In the seventh time section T7, the image sensor 10 may read an electrical charge amount stored in the storage capacitor Cs in each unit frame from photocharges generated in the second photodiode PD2. Referring to FIGS. 3C and 3D, in response to the charge sharing signal CSS and the dual conversion signal DCS each having a high level, the photodetection circuit 110 may provide electrical charges stored in the storage capacitor Cs to the first floating diffusion node FD1. The image sensor 10 may read (S3) an electrical charge amount before the first floating diffusion node FD1 is reset, in order to perform CDS, and may read (R3) an electrical charge amount in a reset state.

In the embodiments of FIGS. 3A, 3B, and 3D, electrical charge amounts generated by photodiodes may be read sequentially in read sections, e.g., without a dual conversion operation. For example, according to the example of FIG.

3D, when photocharges are stored in the plurality of storage capacitors Cs, electrical charge amounts stored in capacitors may be read in an additional read section following the seventh time section T7.

A method, performed by the image sensor 10, of accumulating photocharges generated by the plurality of photodiodes in an accumulation operation and reading out the photocharges generated in each of the plurality of photodiodes sequentially without overlapping has been described above with reference to FIGS. 4 through 6. A method of storing, in the plurality of storage capacitors Cs, the photocharges generated by one photodiode during a plurality of unit accumulation time periods INT will now be described with reference to FIGS. 7 and 8.

Figure 7:
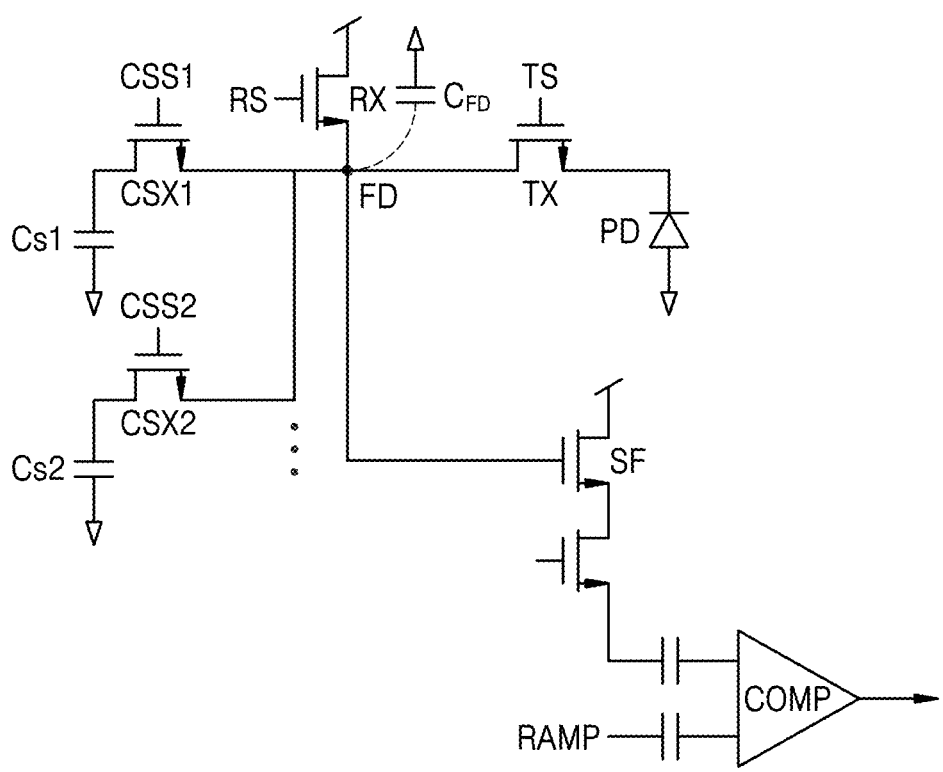
FIG. 7 is a circuit diagram of a structure of a pixel including one photodiode, according to some example embodiments.

FIG. 7 is a circuit diagram of a structure of a pixel PX including one photodiode PD, according to some example embodiments.

Referring to FIG. 7, a photodetection circuit 110 may include the one photodiode PD and a floating diffusion node FD. The plurality of storage capacitors Cs and the plurality of charge sharing transistors CSX may be connected to the floating diffusion node FD in parallel, and photocharges generated in the photodiode PD during different unit accumulation time periods may be stored in different storage capacitors Cs (Cs1, Cs2, . . . etc.) through different charge sharing transistors CSX. Though illustrated as only including two storage capacitors Cs1 and Cs2, the example embodiments are not so limited, the plurality of storage capacitors Cs may include two or more capacitors Cs.

Figure 8:
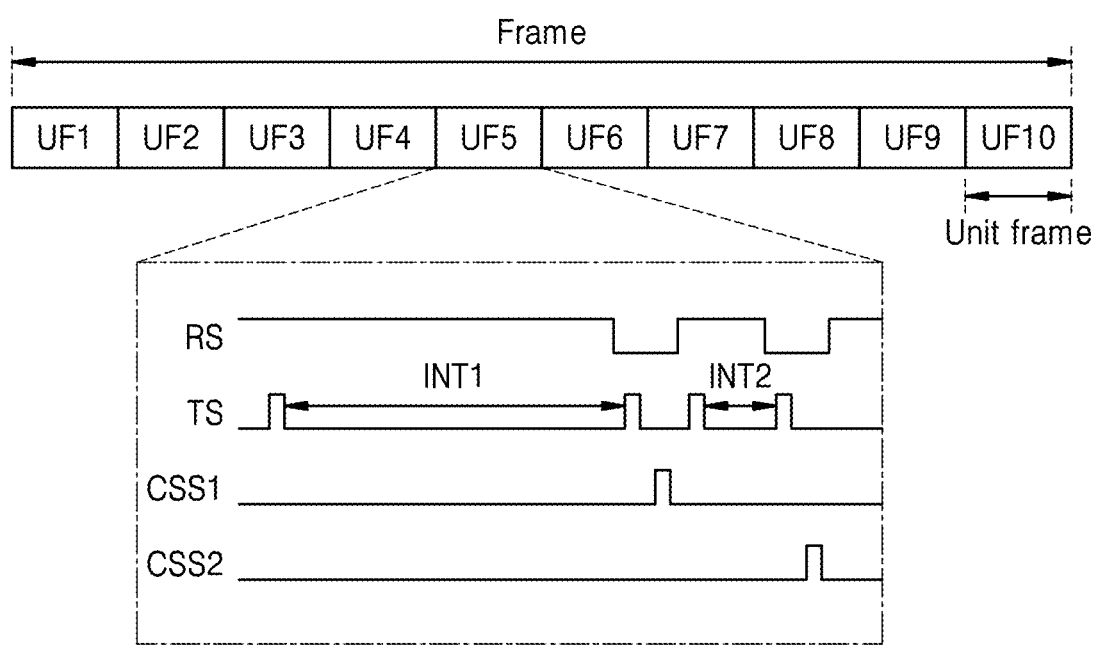
FIG. 8 is a graph showing respective levels of pixel control signals generated in each unit frame, according to the example of FIG. 7.

FIG. 8 is a graph showing respective levels of pixel control signals generated in each unit frame, according to the example of FIG. 7.

According to some example embodiments, when the image sensor 10 generates photocharges through the one photodiode PD during at least two unit accumulation time periods INT1 and INT2, which have different lengths, in each of the plurality of unit frames divided from a frame in an accumulation operation, the image sensor 10 may store photocharges generated in storage capacitor Cs1 and Cs2 respectively corresponding to unit accumulation time periods INT1 and INT2. For example, referring to FIG. 8, the image sensor 10 may store photocharges generated during a first unit accumulation time period INT1 of each unit frame in the first storage capacitor Cs1, and may store photocharges generated during a second unit accumulation time period INT2 of each unit frame in the second storage capacitor Cs2. Although a case of generating photocharges in the first unit accumulation time period INT1 and the second unit accumulation time period INT2 will be described with reference to FIG. 8, the number of unit accumulation time periods INT and the number of storage capacitors Cs are not limited thereto.

The image sensor 10 may start an accumulation operation corresponding to each of the first and second unit accumulation time periods INT1 and INT2 by resetting the photocharges generated in the photodiode PD. The photocharges generated in the photodiode PD before each unit accumulation time period may be received in the floating diffusion node FD as the transfer transistor TX is activated. At this time, when the reset transistor RX is activated, the photocharges accumulated in the floating diffusion node FD may be reset.

Thereafter, as the transfer transistor TX is deactivated, the photodiode PD may generate photocharges again. When the transfer transistor TX is activated again, the photocharges generated during each of the first and second unit accumulation time periods INT1 and INT2 may be transmitted to the floating diffusion node FD. Before the transfer transistor TX is activated again, a reset transistor RX connected to the floating diffusion node FD may be deactivated, and thus, the floating diffusion node FD may receive the photocharges generated in the photodiode PD during each of the first and second unit accumulation time periods INT1 and INT2.

For example, referring to FIG. 8, as the transmission signal TS transitions from a logic high level to a logic low level, the image sensor 10 may generate photocharges during the first unit accumulation time period INT1, and, when the transmission signal TS transitions from a logic low level back to a logic high level, the image sensor 10 may transmit the photocharges generated during the first unit accumulation time period INT1 to the floating diffusion node FD.

According to some example embodiments, as the charge sharing transistor CSX is activated after the first and second unit accumulation time periods INT1 and INT2, the image sensor 10 may store the photocharges accumulated during the first and second unit accumulation time periods INT1 and INT2 in storage capacitors Cs1 and Cs2 allocated in correspondence with the first and second unit accumulation time periods INT1 and INT2, respectively. For example, referring to FIG. 8, as a first charge sharing signal CSS1 transitions to a logic high level after the first unit accumulation time period INT1, the image sensor 10 may store, in the first storage capacitor Cs1, the photocharges received in the floating diffusion node FD during the first unit accumulation time period INT1.

Thereafter, when the first charge sharing signal CSS1 transitions back to a logic low level and the reset signal RS of the logic high level is input, the floating diffusion node FD may be reset, and thus may perform an accumulation operation with respect to a subsequent unit accumulation time period.

For example, referring to FIG. 7, when the reset signal RS and the transmission signal TS each having a logic high level are input to the photodetection circuit 110 before the second unit accumulation time period INT2, the image sensor 10 may reset the photocharges generated in the photodiode PD after the first unit accumulation time period INT1 and before the second unit accumulation time period INT2. The photodiode PD of the image sensor 10 may generate photocharges during the second unit accumulation time period INT2, and, when the transmission signal TS transitions from a logic low level back to a logic high level, the photodiode PD of the image sensor 10 may transmit the photocharges generated during the second unit accumulation time period INT2 to the floating diffusion node FD. As a second charge sharing signal CSS2 transitions to a logic high level after the second unit accumulation time period INT2, the image sensor 10 may store, in the second storage capacitor Cs2, the photocharges received in the floating diffusion node FD during the second unit accumulation time period INT2.

For example, the image sensor 10 of FIG. 3D may store, in the different first and second storage capacitors Cs1 and Cs2, the photocharges accumulated in the second photodiode PD2 during the plurality of unit accumulation time periods INT1 and INT2 according to the embodiment of FIG. 8.

The image sensor of FIG. 7 may read an electrical charge amount stored in each of the plurality of storage capacitors Cs by activating the plurality of charge sharing transistors CSX at different time points in a read operation after an accumulation operation comprising a plurality of unit frames of FIG. 8. For example, when the first charge sharing transistor CSX1 is activated at a first time point, the image sensor 10 may read an electrical charge amount stored in the first storage capacitor Cs1, and, when the second charge sharing transistor CSX2 is activated at a second time point that is different from the first time point, the image sensor 10 may read an electrical charge amount stored in the second storage capacitor Cs2.

According to some example embodiments, the first unit accumulation time period INT1 and the second unit accumulation time period INT2 may have different time lengths, and a time length of each unit accumulation time period INT may depend on an illuminance level. For example, the image sensor 10 may accumulate photocharges during a long unit accumulation time period INT in order to generate a low-illuminance image, and may accumulate photocharges during a short unit accumulation time period INT in order to generate a high-illuminance image.

Figure 9:
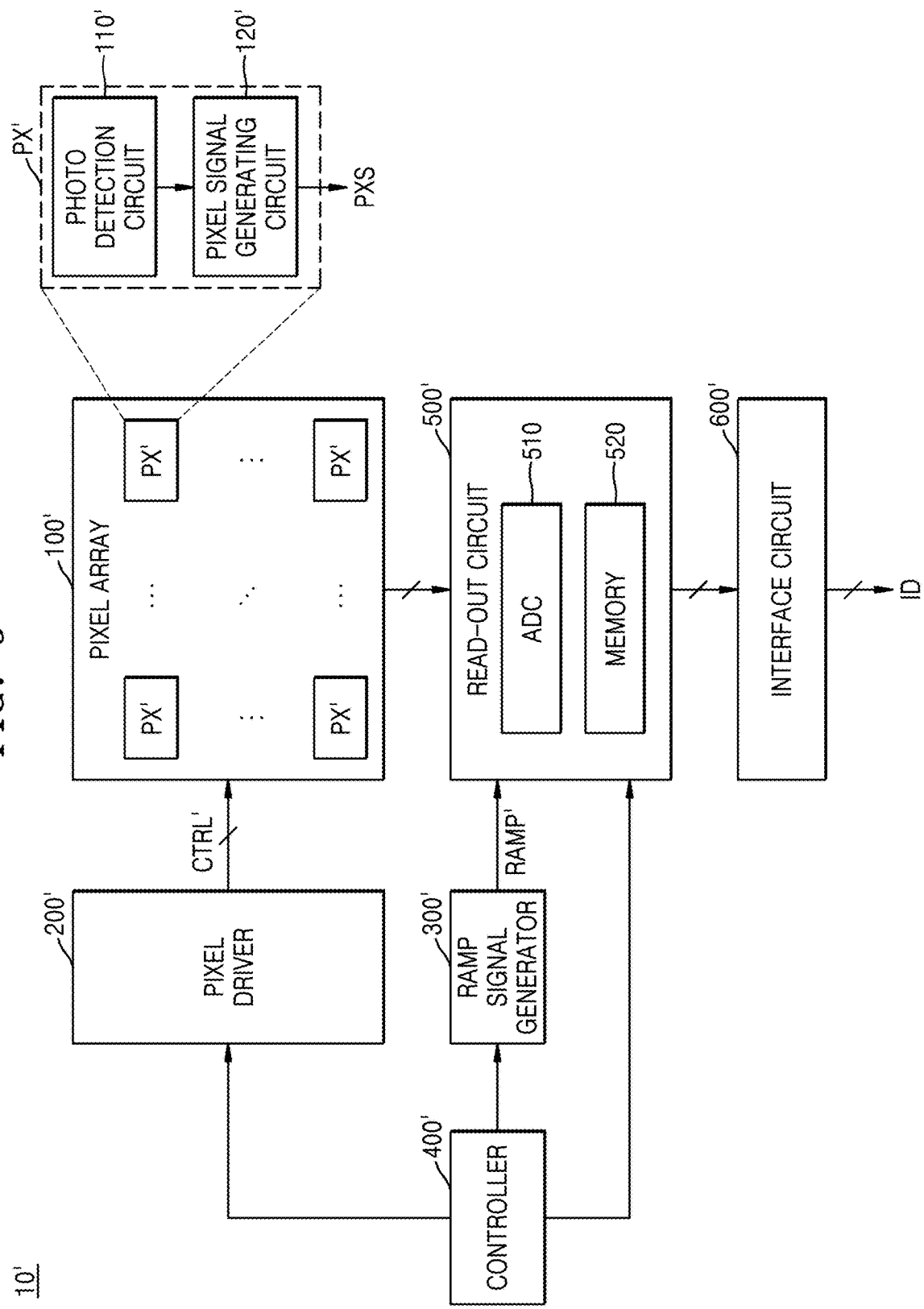
FIG. 9 is a block diagram of an image sensor according to some example embodiments.

FIG. 9 is a block diagram of an image sensor 10' according to another embodiment.

A pixel PX' shown in FIG. 9, which is an example of a pixel including a capacitor, is a pixel capable of a global shutter operation. As compared with the image sensor 10 of FIG. 1, the image sensor 10' of FIG. 9 may include an ADC 510, which may not be included in the pixel PX' but be provided outside a pixel array 100'. Reference numerals of FIG. 9 that are the same as those of FIG. 1 will not be described again here.

Referring to FIG. 9, the image sensor 10' may include the pixel array 100', a pixel driver 200', a ramp signal generator 300', a controller 400', a read circuit 500', and an interface circuit 600'. The pixel array 100' may include a plurality of pixels PX', each of which may be configured to sense an external optical signal and output a pixel signal PXS corresponding to the sensed optical signal.

In the pixel array 100', the plurality of pixels PX' may be arranged in a matrix form in a plurality of rows and a plurality of columns. In a global shutter mode, the image sensor 10' may control points in time at which photocharges are accumulated in the pixels PX' arranged in different rows to be the same, and eliminate image distortion caused by a difference in photocharge accumulation time.

The pixel PX' may include a photodetection circuit 110' and a pixel signal generating circuit 120'. The photodetection circuit 110' may include a photo sensing device, and may convert the optical signal sensed from the outside into an electrical signal, that is, a detection signal that is an analog signal. The detection signal may include a detection signal caused by a reset operation of the photodetection circuit 110' and include a detection signal caused by a photodetection operation of the photodetection circuit 110'.

The pixel signal generating circuit 120' may receive the detection signal, generate a pixel signal PXS corresponding to the detection signal, and output the pixel signal PXS through a column line.

The image sensor 10' may accumulate photocharges during a unit accumulation time period of a certain percentage of a unit frame in each of a plurality of unit frames into which one frame is divided, and may generate image data, based on photocharges accumulated during a plurality of unit accumulation time periods. At this time, the image sensor 10' may generate an HDR image by accumulating photocharges in one unit frame in correspondence with unit accumulation time periods having different time lengths.

The pixel driver 200' may output control signals CTRL' for controlling the plurality of pixels PX' included in the pixel array 100'. In response to the control signals CTRL' generated by the pixel driver 200', each of the plurality of pixels PX' may operate in a plurality of operation modes according to illuminance According to some example embodiments, to operate in the global shutter mode, the pixel driver 200' may determine points in time at which the control signal CTRL' to be output to each of the plurality of pixels PX' is activated and deactivated.

The ramp signal generator 300' may generate the ramp signal RAMP' and provide the ramp signal RAMP' to the readout circuit 500' (e.g., the ADC 510). The ramp signal RAMP', which is a signal for converting an analog signal into a digital signal, may be generated as a triangular wave signal.

The read circuit 500 may include the ADC 510 and a memory 520. The ADC 510 may sample and hold the pixel signal PXS provided by the pixel array 100', and perform a CDS operation for doubly sampling a reset signal and an image signal to output a level corresponding to a difference between the reset signal and the image signal. The ADC 510 may receive the ramp signal RAMP', compare the ramp signal RAMP' with each of the reset signal and an image signal, and output a comparison result signal. The ADC 510 may convert the comparison result signal into a digital signal. The memory 520 may latch the digital signal and sequentially output pieces of latched image data ID.

In this disclosure, the terms "controller," "driver," "unit" and/or "circuit" may denote elements that process (and/or perform) at least one function or operation and may be included in and/or implemented as processing circuitry such hardware, software, or the combination of hardware and software. For example, the processing circuitry more specifically may include (and/or be included in), but is not limited to, a processor, Central Processing Unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While the inventive concepts have been particularly shown and described with reference to embodiments thereof, it will be understood that various changes in form and details may be made therein without departing from the spirit and scope of the following claims.

What is claimed is:

1. A pixel array comprising a plurality of pixels, wherein each of the plurality of pixels comprises:
   a photodiode configured to generate a photocharge in a frame including a plurality of unit frames;
   a floating diffusion node configured to receive the photocharge;
   a first storage capacitor configured to store a first photocharge received from the floating diffusion node based on a first charge sharing signal, wherein the first photocharge generated by the photodiode during a first unit accumulation time period in each of the plurality of unit frames; and
   a second storage capacitor configured to store a second photocharge received from the floating diffusion node based on a second charge sharing signal, wherein the second photocharge generated by the photodiode during a second unit accumulation time period in each of the plurality of unit frames,
   wherein a start of the second unit accumulation time period is after the first unit accumulation time period ends and the floating diffusion node is reset.

2. The pixel array of claim 1, wherein the first unit accumulation time period is longer than the second unit accumulation time period.

3. The pixel array of claim 1, wherein the first unit accumulation time period is shorter than a section during which a light emitting diode (LED) light source is turned on.

4. The pixel array of claim 1, wherein each of the plurality of pixels further comprises a source follower configured to read the first photocharge through the floating diffusion node in a first read section after the frame and read the second photocharge through the floating diffusion node in a second read section after the frame.

5. The pixel array of claim 4, wherein each of the plurality of pixels further comprises an analog-to-digital converter configured to convert a first detection signal corresponding to the read first photocharge into a first digital signal and convert a second detection signal corresponding to the read second photocharge into a second digital signal.

6. The pixel array of claim 5, wherein
the pixel array comprises a first semiconductor substrate and a second semiconductor substrate that is stacked on the first semiconductor substrate,
the first semiconductor substrate comprises the photodiode, the floating diffusion node, the first storage capacitor, the second storage capacitor, and the source follower, and
the second semiconductor substrate comprises the analog-to-digital converter.

7. An image sensor comprising a pixel array,
wherein the pixel array comprises a plurality of pixels, and
each of the plurality of pixels comprises:
 a first photodiode configured to generate a first photocharge for a first unit accumulation time period in each of a plurality of unit frames included in a frame;
 a second photodiode configured to generate, in each of the plurality of unit frames, a second photocharge for a second unit accumulation time period and generate a third photocharge for a third unit accumulation time period;
 at least one floating diffusion node configured to receive at least one of the first photocharge, the second photocharge, and the third photocharge;
 a first storage capacitor configured to receive, through the at least one floating diffusion node, and store the second photocharge; and
 a second storage capacitor configured to receive, through the at least one floating diffusion node, and store the third photocharge.

8. The image sensor of claim 7, wherein the first unit accumulation time period comprises at least a portion that overlaps at least one of the second unit accumulation time period and the third unit accumulation time period.

9. The image sensor of claim 7, wherein a length of the second unit accumulation time period is different from a length of the third unit accumulation time period.

10. The image sensor of claim 7, wherein the first unit accumulation time period corresponds to a section from a time point when resetting of the photodiode is released to a time point when the at least one floating diffusion node receives a photocharge.

11. The image sensor of claim 7, wherein each of the plurality of pixels further comprises a source follower configured to read the first photocharge through the at least one floating diffusion node in a first read section after the frame and read at least one of the second photocharge stored in the first storage capacitor and the third photocharge stored in the second storage capacitor through the at least one floating diffusion node in a second read section after the frame.

12. The image sensor of claim 11, wherein each of the plurality of pixels further comprises an analog-to-digital converter configured to convert detection signals respectively corresponding to the read first, second, and third photocharges into digital signals.

13. The image sensor of claim 12, wherein
the pixel array comprises a first semiconductor substrate and a second semiconductor substrate that is stacked on the first semiconductor substrate,
the first semiconductor substrate comprises the first photodiode, the second photodiode, the at least one floating diffusion node, the first storage capacitor, the second storage capacitor, and the source follower, and
the second semiconductor substrate comprises the analog-to-digital converter.

14. The image sensor of claim 7, wherein
the at least one floating diffusion node further comprises:
 a first floating diffusion node configured to receive the first photocharge from the first photodiode; and
 a second floating diffusion node configured to receive the second or third photocharge from the second photodiode, and
each of the plurality of pixels further comprises a dual conversion transistor configured to connect the first floating diffusion node to the second floating diffusion node when activated, and configured to be deactivated in the frame.

15. The image sensor of claim 14, wherein the dual conversion transistor is deactivated during a first read section in which the first photocharge is read after the frame, and is activated during a second read section in which the first photocharge is read after the first read section.

16. The image sensor of claim 15, wherein
the second photocharge stored in the first storage capacitor is read during a third read section after the second read section, and
the third photocharge stored in the second storage capacitor is read during a fourth read section after the third read section.

17. The image sensor of claim 16, wherein the dual conversion transistor is activated during the third read section and the fourth read section.

18. The image sensor of claim 16, further comprising a digital signal processor configured to generate image data based on digital signals respectively corresponding to the photocharges read in the first read section, the second read section, the third read section, and the fourth read section.

* * * * *

UNITED STATES PATENT AND TRADEMARK OFFICE
CERTIFICATE OF CORRECTION

| | | |
|---|---|---|
| PATENT NO. | : 12,395,761 B2 | Page 1 of 1 |
| APPLICATION NO. | : 17/879497 | |
| DATED | : August 19, 2025 | |
| INVENTOR(S) | : Minwoong Seo et al. | |

It is certified that error appears in the above-identified patent and that said Letters Patent is hereby corrected as shown below:

On the Title Page

Item (73) Assignee: "Samsung Electronics Co., Ltd, Gyeonggi-do (KR)" Should be corrected to show -- Samsung Electronics Co., Ltd., Gyeonggi-do (KR) --

Signed and Sealed this
Twenty-seventh Day of January, 2026

John A. Squires
*Director of the United States Patent and Trademark Office*